United States Patent [19]

Hawkins

[11] 4,011,649

[45] Mar. 15, 1977

[54] CLIP LOCK CLAMPING TOOL

[75] Inventor: Ronald G. Hawkins, Massena, N.Y.

[73] Assignee: Aluminum Company of America, Pittsburgh, Pa.

[22] Filed: Dec. 31, 1975

[21] Appl. No.: 645,804

[52] U.S. Cl. .................................................. 29/267
[51] Int. Cl.[2] ........................................ B23P 19/04
[58] Field of Search .................. 29/267, 244; 72/125

[56] References Cited

UNITED STATES PATENTS

| 3,813,756 | 6/1974 | Rigsby et al. | 29/267 |
| 3,887,985 | 6/1975 | Zenon | 29/267 |

Primary Examiner—James L. Jones, Jr.
Attorney, Agent, or Firm—Elroy Strickland; William J. O'Rourke, Jr.

[57] ABSTRACT

A clamping tool for disposing a resilient clip over clamping structures adapted to be secured together. The tool comprises a seating member adapted to receive the head of the clip, a C-shaped arm connecting the seating member to a handle assembly and a toggle assembly. The toggle assembly has a movable shaft extending into a bore provided in the handle assembly and in the direction of the seating member. A lever arm is pivotally connected to the shaft to direct the shaft against one side or edge of the clamping structures such that a clip received in the seating member and disposed over the clamping structures located between the shaft and the seating member, will, upon application of adequate manual force, extend over and secure the clamping structures together.

5 Claims, 5 Drawing Figures

CLIP LOCK CLAMPING TOOL

BACKGROUND OF THE INVENTION

1. Field of the Invention

The present invention relates generally to a tool for disposing a resilient clip over clamping structures adapted to be secured together by the clip and, more particularly, to a tool for applying a resilient clip to spacing devices for overhead electrical conductors.

2. Description of the Prior Art

In recent years, with the increases in electrical power being carried by overhead conductors, bundles of overhead conductors are employed and are supported from modern electrical transmission towers. Usually, each bundle carrys one phase of a three phase source of alternating current energy. The towers are spaced at such distances that adjacent wires of a bundle may contact each other as a result of wind or electromagnetic inducement. For this reason, spacing devices have been developed to maintain the separation between the wires of a bundle at certain intervals along their length. Such spacing devices are discussed in U.S. Pat. Nos. 2,915,580, 3,110,757 and 3,161,721.

These spacing devices for electrical conductors consist of a bar or series of bars having clamps at each end. The clamps have traditionally been pivoted on the bar and secured on the conductors by means of threaded bolts. The use of bolts to secure the clamps has proven to be time consuming and unreliable as linemen could overtighten or undertighten the bolts, resulting in the clamps coming loose, with eventual attendant damage to the conductor.

As an alternative to the use of bolts to secure the clamps of a spacing device on electrical conductors, resilient metal clips have been developed of the type shown in U.S. Pat. Application Ser. No. 610,527, filed on Sept. 5, 1975 in the names of the present inventor and C. R. Russ. The Hawkins and Russ clip is provided with two leg portions each having planar inward extensions adapted to extend over and engage two planar surfaces in the clamp of the spacing device after the clips are disposed around the clamp. When the planar extensions engage or seat over a mating ledge of the spacing device, a snap is heard so that the lineman knows that the clamp structures are secured together on the electrical conductor.

Such installed clamps must constantly embrace the associated electrical conductor through the agency of a resilient bushing. The amount of force necessary to seat the resilient clip against the resilience of the bushing is such that it is impossible to apply the clip with the direct manual pressure applied by the hand of the lineman. Also, pounding against the head of the clip with a hammer or similar tool is more often than not insufficient because of the difficult positions from which the linemen must work and because of the bounce in the resilient bushing made of rubber or other elastomer material. Also, considering that the conductors are on rather long spans, often in the area of 1400 feet, there would be considerable bounce in the conductors themselves when striking such a direct blow. A glancing blow, on the other hand, could result in the clip falling to the ground or damage to the conductor or the clamp or both. Additionally, the length from the head of the clip to the ledge of the clamp is such that a conventional pair of pliers could not transverse the length necessary to properly grip the clip and seat it into the ledge on the clamp. Furthermore, the use of pliers could mar or gouge the cast finish which would result in the undesirable phenomena known as corona discharge.

Accordingly, a tool is required to seat the Hawkins and Russ clips on conductor clamps.

SUMMARY OF THE INVENTION

The present invention is directed to such a tool and may be summarized as a clip lock clamping tool for disposing a resilient clip over clamping structures adapted to be secured together. In its broad aspects, this tool comprises a seating member having a recess designed to engage the head of the clip, initially disposed on a conductor clamp, a C-shaped arm connected to the seating member and extending from the seating members so as not to interfere with the conductor clamp. A handle assembly is connected to the other end of the C-shaped arm, and includes a body portion with a bore extending therethrough in the direction of the seating member, and a hand grip portion extending from the body portion. A toggle assembly having a shaft extends from a base portion and through the bore in the handle assembly in the direction of the seating member. A movable shaft, positioned inside a mating chamber in the core, is pivotally connected to the elbow of an L-shaped lever arm.

In its narrower aspects, this invention includes a metal clip lock clamping tool for disposing a resilient clip over a clamp on a spacing device for overhead electrical conductors.

BRIEF DESCRIPTION OF THE DRAWINGS

The objectives and advantages of the invention will be best understood from consideration of the following detailed specification when considered in connection with the accompanying drawings in which.

DESCRIPTION OF THE PREFERRED EMBODIMENTS

Figure 1:
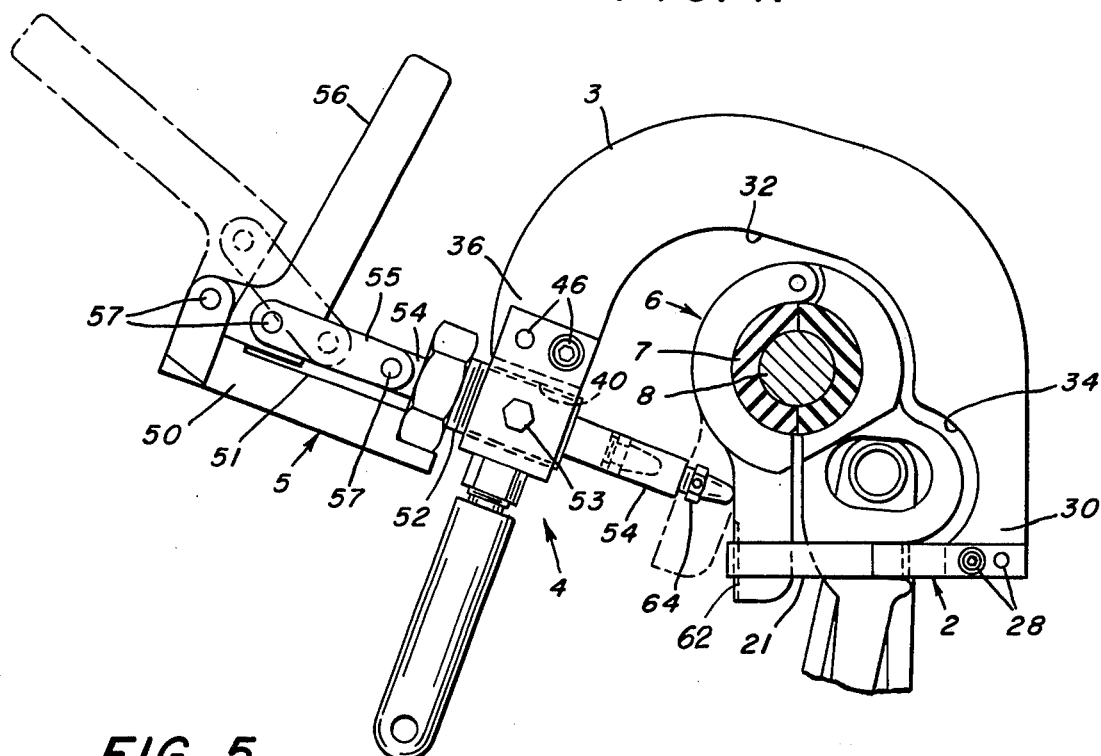
FIG. 1 is a side elevation view of the clip lock clamping tool of the invention with clamping structure and clip properly positioned therein before application of this invention.
Figure 2:
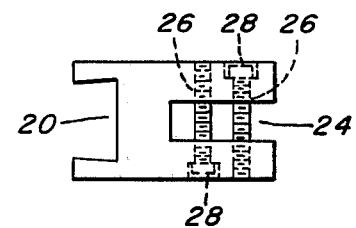
FIG. 2 is a top elevation view of the seating member of the tool of FIG. 1.
Figure 3:
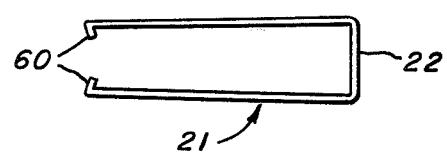
FIG. 3 is a top elevation view of a clip to be applied by this invention.

Referring particularly to the drawings, FIG. 1 illustrates a clip lock clamping tool including an assembly of four general parts; a seating member 2, a C-shaped arm 3, a handle assembly 4 and a toggle assembly 5. FIG. 1 further illustrates a clamping structure 6 properly positioned in the tool, with bushing 7 and conductor 8 located within the clamping structure 6. A top elevation view of the seating member 2 is shown in FIG. 2 as having a recess 20 designed to conform to the shape of the head of clip 21. Recess 20 would be particularly adapted to fit the contour 22 of the head of the clip 21, as illustrated, for example, in FIG. 3.

Seating member 2 may be provided with a slot 24 opposite the recess 20. This slot 24 should conform with the dimensions of the C-shaped arm 3 where the seating member 2 will be connected. This connection can be made by machining adjacently disposed holes 26 through the width of the seating member 2 with both holes 26 passing through the slot 24 and inserting screws 28 therethrough. Corresponding holes should be machined through the head end 30 of the C-shaped arm 3 such that screws 28 inserted through the ends of the seating member 2 will pass through the head end 30 of the C-shaped arm 3 and tightly secure the seating member 2 to the U-shaped arm 3. In this preferred embodiment, the connection is held by Allen screws 28. Such a connection facilitates readily interchangeable seating members 2 in the event that the surface of the heads of a series of clips to be applied does not conform to the recess 20 of the seating member 2 presently on the tool. It will be understood by those skilled in the art that the seating member 2 may be manufactured in a manner that the recess 20 is adjustable in width by, for example, mechanical means and in length by, for example, using various inserts. Similarly the recess 20 may be angularly adjustable to correspond to the contoured configuration of the head 22 of the clip 21. However, it should be understood that a variety of methods may be employed to connect the seating member 2 to the C-shaped arm 3 or, the arm and seating member can be constructed as a single unitary part of the clamping tool when interchangeability or adjustability is not required.

The C-shaped arm 3, which is connected at its head end 30 to the seating member 2, extends from this connection in such a configuration so as not to interfere with the clamping structures. The inside surface 32 of the C-shaped arm 3 may have to be provided with a further indentation 34 depending on the shape of the clamping structures. This feature is best understood by reference to FIG. 1 illustrating a clamping structure 6 having such a configuration that it could not be secured with this tool if the inside surface 32 had not been provided with a further indentation 34.

Figure 4:
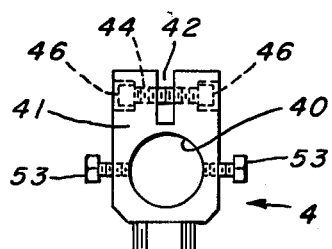
FIG. 4 is a front elevation view of the handle assembly of the tool of FIG. 1.

The C-shaped arm 3 is connected at its tail end 36 to the handle assembly 4. A front elevation view of handle assembly 4 is illustrated in FIG. 4. The arm 3 extends such that a bore 40 through the body portion 41 of the connected handle assembly 4 faces the recess 20 in the seating member 2 connected at the other end 30 of the arm 3.

The body portion 41 of the handle assembly 4 may be provided with a slot 42 conforming with the dimensions of the C-shaped arm 3 where the handle assembly 4 will be connected. Like the connection of the seating member 2 this connection can be made by machining adjacently disposed holes 44 through the width of the body portion 41 with both holes passing through the slot 42. Corresponding holes should be machined through the tail end 36 of the C-shaped arm 3 such that screws 46 inserted through the body portion 41 will pass through the tail end 36 of the C-shaped arm 3 and tightly secure the handle assembly 4 to the C-shaped arm 3. A variety of alternative methods may be employed to make this connection, or both the handle assembly 4 and the arm 3 may be constructed as a single integral part of the clamping tool.

Extending from the body portion 41 of the handle assembly 4 is a grip 48. The grip 48 should be of such size and shape that it could be easily grasped and tightly held by a workman's hand. In a preferred embodiment the grip 48 is cylindrical, having a length of approximately 4 to 5 inches and a diameter of approximately one inch. The grip 48 may also be knurled on its exterior surface, or provided with finger sized indentations to further insure a firm hold on the tool.

Figure 5:
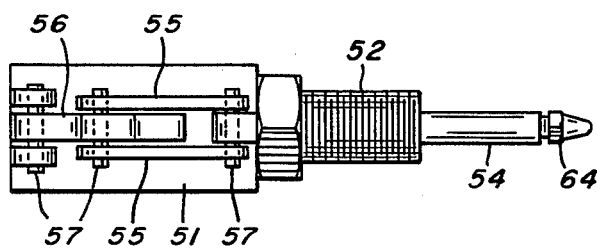
FIG. 5 is a top elevation view of the toggle assembly of the tool of FIG. 1.

The final part of the clip lock clamping tool is the toggle assembly 5. A top elevation view of toggle assembly 5 as illustrated in FIG. 5 shows a base portion 50 upon which is a flat surface 51 which terminates at the beginning of the core 52. Core 52 extends from base portion 50 and is designed to be fitted into the bore 40 in the handle assembly 4. In a preferred embodiment the core 52 is cylindrical with its exterior surface threaded to mate corresponding threads in the interior surface of the body 41 of the handle assembly 4 defining the bore 40. To assure that the core 52 is in a fixed position when threaded into the bore 40, set screws 53 can be provided to pass through the body 41 of the handle assembly 4 and engage the core 52 threaded therethrough to further bind the parts tightly together.

A movable shaft 54 is positioned inside a mating chamber centrally located inside the core 52. Substantially flat parallel radius bars 55 connect the rear of the shaft 54 to the elbow of an L-shaped lever arm 56. This connection is made by inserting one pivot pin 57 through one end radius bars 55 with the shaft 54 positioned therebetween and another pivot pin 57 through the other end of the radius bars 55 with the elbow of the lever arm 56 positioned therebetween. A third pivot pin 57 connects the tip of the lever arm 56 to the base 50 of the toggle assembly 5. The assembly described immediately above is known as a toggle joint of which there are numerous examples in the art, including U.S. Fraser Pat. No. 3,912,251.

The parts of the clip lock clamping tool of this invention are preferably metallic. However, it should be apparent that some or all of the parts may be constructed of plastic, wood or other rigid material depending on the ultimate use of the tool.

The operation of the clip lock clamping tool of this invention is as follows. In FIG. 1, the clamping structure 6 is properly positioned inside the C-shaped arm 3 of the clamping tool such that the clip 21 loosely overlying the clamping structure 6 fits into the recess 20 of the seating member 2. Upward rotational displacement of lever arm 56 of toggle assembly 5 reciprocally drives shaft 54 into the clamping structure 6 opposite the head end of clip 21. Further upward rotational displacement of lever arm 56, causes the shaft 54, which is engaged with the surface of the clamping structure 6, to force the structure 6 past the resilient legs of clip 21. When the inward extensions 60 of clip 21, shown in FIG. 3, extend over the ledge 62 of the clamping structure 6, a snapping sound is made so that the installer will know that the clamp is secure.

In a preferred embodiment, the terminal end of the retractable shaft 54 which engages the clamping structure 6 is frustoconical. This generally pointed configuration enhances the engagement with the clamping structure to hold it secure enough to facilitate the assembly of the spacer to the conductor bundle. Additionally, a tapered configuration provides the clearance necessary to allow the inward extensions 60 of the clip 21 to seat in the ledge 62 of the clamping structure 6 without engaging the surface of the retractable shaft 54.

The force delivered from a toggle joint 5 increases as the lever arm 56 is further displaced; therefore, optimum force through maximum mechanical advantage is obtained at the apex of displacement of the lever arm 56. Also, when seating a resilient clip 21 over a clamping structure 6, maximum force is required immediately before the clip 21 seats in the ledge 62 of the clamping structure 6. Since clips 21 and clamping structures 6 have various shapes and sizes, it is desirable to be readily able to adjust the length of the retractable shaft 54 in order to insure maximum effective utilization and ease in application of the tool. In the preferred operation of the clip lock clamping tool of this invention it should be understood that the desired depth of penetration of the shaft 54 can be adjusted by loosening set screws 53 on the body 41 of the handle assembly 4. Then, the threaded core 52 of the toggle assembly 5 can be adjusted by screwing to the required depth whereupon the set screws 53 are re-tightened. Alternatively, the tip of the retractable shaft 54 can be threaded to receive a bolt 64 which can be screwed to various depths thereby adjusting the effective length of the retractable shaft 54. Tightening of bolt 64 will lock the retractable shaft 54 in its desired adjusted position.

It should be further understood that the lever arm 56 of toggle assembly 5 can be rotated by loosening the set screws 53 in the handle assembly 4 if the installer has a preference or need for downward or outward rotational displacement in installing clips over a structure such as 6. There is a further advantage of having the core 52 of the toggle assembly 5 threaded on its exterior surface. If the penetration depth of the retractable shaft 54 has been improperly adjusted, upon attempting to seat a clip 21, it may happen that only one side of the inward extensions 60 of the clip 21 becomes seated in the ledge 62 of the clamping structure 6. By simply loosening set screws 53, the toggle assembly 5 can be rotated in a clockwise direction by turning the lever arm 56 thus increasing the penetration depth of the retractable shaft 54 which will provide the necessary force to seat the other inward extension 60. This procedure may also be followed to remove the clip locks, by so screwing the toggle assembly 5 until the spacer sections are compressed and the clip 21 is free to be snapped off the clamping structure 6.

Whereas the particular embodiments of this invention have been described above for purposes of illustration, it will be apparent to those skilled in the art that numerous variations of the details may be made without departing from the invention.

What is claimed is:

1. A clamping tool for disposing a resilient clip having two leg portions each with inwardly directed extensions thereon over a clamping structure adapted to be secured together by forcing said extensions of said clip over mating ledges on said structure comprising:
    a seating member having a recess therein adapted to engage the head of the clip to be applied to the clamping structure,
    a generally C-shaped arm connected at the one end thereof to said seating member,
    a handle assembly located adjacent the other end of said C-shaped arm having a bore therethrough in the direction of the seating member, and
    a toggle assembly fitted into said bore and having a movable shaft connected thereto, said shaft having a tip adapted to be displaced along a line substantially centrally directed toward said recess in the seating member to engage the clamping structure and force said structure past said extensions of said clip.

2. A clamping tool as set forth in claim 1 in which the width dimension of the recess in the seating member is adjustable.

3. A clamping tool as set forth in claim 1 in which a core of the toggle assembly is threaded to fit corresponding threads in the bore of the handle assembly whereby the toggle assembly is rotatably adjustable around the handle assembly.

4. A clamping tool as set forth in claim 3 in which the connection between the toggle assembly and the handle assembly is further maintained by at least one set screw which passes through the body of said handle assembly into the core of said toggle assembly.

5. A clamping tool as set forth in claim 1 in which a hand grip depends from the handle assembly.

* * * * *